(12) United States Patent
Dybdal et al.

(10) Patent No.: US 8,614,644 B2
(45) Date of Patent: Dec. 24, 2013

(54) SYSTEMS AND METHODS FOR PROTECTING A RECEIVING ANTENNA FROM INTERFERENCE BY A TRANSMITTING ANTENNA

(75) Inventors: Robert B. Dybdal, Palos Verdes Estates, CA (US); Keith M. SooHoo, Long Beach, CA (US); Samuel J. Curry, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 209 days.

(21) Appl. No.: 12/765,577

(22) Filed: Apr. 22, 2010

(65) Prior Publication Data

US 2011/0260920 A1 Oct. 27, 2011

(51) Int. Cl.
*G01S 3/16* (2006.01)
*G01S 3/28* (2006.01)

(52) U.S. Cl.
USPC .......................... 342/383; 342/379; 342/380

(58) Field of Classification Search
CPC .............................. G01S 7/2813; H04B 1/0475
USPC ............ 342/379–384, 360; 455/114.2, 278.1; 343/703
See application file for complete search history.

(56) References Cited

U.S. PATENT DOCUMENTS

| | | | |
|---|---|---|---|
| 2,825,900 A | 3/1958 | Collbohm | |
| 3,177,489 A * | 4/1965 | Saltzberg | 342/381 |
| 3,202,990 A | 8/1965 | Howells | |
| 3,696,429 A | 10/1972 | Tressa | |
| 4,085,368 A | 4/1978 | Yeh | |
| 4,107,609 A | 8/1978 | Gruenberg | |
| 4,246,585 A | 1/1981 | Mailloux | |
| 4,608,569 A * | 8/1986 | Dickey et al. | 342/384 |
| 4,991,165 A | 2/1991 | Cronyn | |
| 5,440,308 A | 8/1995 | Dybdal et al. | |
| 5,739,788 A | 4/1998 | Dybdal et al. | |
| 5,781,845 A | 7/1998 | Dybdal et al. | |
| 6,018,643 A | 1/2000 | Golemon et al. | |
| 6,046,697 A * | 4/2000 | Overbury et al. | 342/360 |
| 6,078,800 A | 6/2000 | Kasser | |
| 6,215,812 B1 | 4/2001 | Young et al. | |

(Continued)

OTHER PUBLICATIONS

Dybdal et al., "Adaptive transmit antenna," 1997 IEEE AP-S Symposium Digest, Jul. 13-18, 1997, pp. 2410-2413, Montreal, Canada.

(Continued)

*Primary Examiner* — Dao Phan
(74) *Attorney, Agent, or Firm* — Jones Day; Jaime D. Choi (57) ABSTRACT

Embodiments of the invention provide systems and methods for systems and methods for adaptively canceling interfering signals generated by a transmission antenna. Under one aspect, a system includes: an auxiliary antenna co-located with the main antenna, the auxiliary antenna configured to transmit an auxiliary signal to the victim antenna; a sensing antenna located on a line-of-sight path between the transmission antenna and the victim antenna, the sensing antenna configured to receive a composite of the interference and the auxiliary signal, and to output a first signal based on the received composite; a controller comprising an input coupled to the sensing antenna and configured to receive the first signal, the controller being configured to adjust at least one of an amplitude, a phase, a polarization, and a frequency characteristic of the auxiliary signal based on the first signal so as to reduce the composite of the interference and the auxiliary signal received by the sensing antenna.

19 Claims, 6 Drawing Sheets

(56) References Cited

U.S. PATENT DOCUMENTS

| | | |
|---|---|---|
| 6,311,045 B1 | 10/2001 | Domokos |
| 6,404,387 B1 * | 6/2002 | Kihira et al. .................. 342/378 |
| 6,539,204 B1 | 3/2003 | Marsh et al. |
| 6,768,444 B2 * | 7/2004 | Langsford ...................... 342/17 |
| 6,952,455 B1 | 10/2005 | Banister |
| 7,006,039 B2 | 2/2006 | Miyamoto et al. |
| 7,031,368 B1 | 4/2006 | Maruta et al. |
| 7,274,752 B2 | 9/2007 | Lo |
| 7,317,916 B1 | 1/2008 | Chang et al. |
| 7,321,636 B2 | 1/2008 | Harel et al. |
| 7,366,244 B2 | 4/2008 | Gebara et al. |
| 7,430,430 B2 | 9/2008 | Li et al. |
| 7,522,883 B2 | 4/2009 | Gebara et al. |

OTHER PUBLICATIONS

Dybdal et al., "Deaden: A new adaptive cancellation technique," 1995 IEEE MILCOM Symposium Digest, Nov. 5-8, 1995, Paper C1.1, 5 pages, San Diego, CA.

* cited by examiner

SYSTEMS AND METHODS FOR PROTECTING A RECEIVING ANTENNA FROM INTERFERENCE BY A TRANSMITTING ANTENNA

STATEMENT OF GOVERNMENT INTEREST

This invention was made with government support under Contract No. FA8802-09-C-0001 awarded by the United States Air Force. The government has certain rights in the invention.

FIELD OF THE INVENTION

This application generally relates to systems and methods for reducing interference caused by a transmitting antenna in a nearby receiving antenna.

BACKGROUND

A signal generated by a transmitting antenna may cause interference for a nearby receiving antenna, i.e., a so-called "victim" antenna, which may inhibit the victim's ability to receive signals. Specifically, when a transmission antenna is configured to transmit a main signal to a target antenna, sidelobes of the main signal may extend in a variety of directions, and in particular, in the direction of the victim. The signal received by the victim antenna depends on the transmitted power level, the gain of the sidelobe level of the transmission antenna, the separation between the transmission and victim antennas, and the characteristics of the victim receiving antenna. The sidelobes of the transmission antenna have an angular dependence, so that changes in the transmission antenna's target antenna location results in changes in the signal level received by the victim antenna. Thus, the interference received by the victim antenna may vary with time and may exceed an interference level that disrupts the operation of the victim antenna.

Several prior art systems for reducing unintentional interference with victim antenna reception have been developed. Such systems typically involve either modifying the transmission antenna so as to reduce the presence of sidelobes, or modifying the victim antenna so as to cancel received interference. One example of a transmitter-side modification is disclosed in U.S. Pat. No. 5,781,845 to Dybdal et al. That patent discloses a system including several antenna elements and adaptive weighting circuitry, which adjusts weighting coefficients during transmission. That patent addresses an adaptive antenna design having broad coverage requirements that illuminates the surrounding terrain, resulting in reflected signal components referred to as multipath that may interfere and degrade reception of the signal received by a target receiver. The antenna elements also sample the reflected multipath signals, which are cross-correlated with the transmitted signal. This cross-correlation is minimized so as to reduce the transmitted strength of an interfering, multipath signal. However, when the transmission antenna is more directive than the broad coverage antenna described in U.S. Pat. No. 5,781,845, the antenna system may be installed in a fixed location whose siting is specifically examined and selected to minimize multipath.

An example of a receiver-side modification is disclosed in U.S. Pat. No. 5,440,308 to Dybdal et al., which discloses a main antenna that receives a desired signal through a main beam, and interference at an angle different than that of the main beam. Auxiliary antennas also receive the interference signals, and the output of the main antenna is cross-correlated with the elements of the auxiliary antenna. This cross-correlation is minimized so as to reduce the interference signal received by the main antenna. However, such receiver-side modifications may be expensive or complicated to implement, and further require positive action by the owner/operator of the victim antenna. In addition, such receiver-side modifications result in creating pattern nulls in the victim's antenna that may undesirably reduce the victim's antenna coverage.

SUMMARY OF THE INVENTION

Embodiments of the present invention provide systems and methods for protecting a victim antenna from interference by a transmission antenna. Such systems and methods include co-locating an auxiliary transmission antenna system with a main transmission antenna transmitting a main signal to a target antenna, as well as locating a sensing antenna on a line-of-sight path between the transmission antenna and the victim receiving antenna. As the main antenna generates the main signal, it may concurrently generate interfering signals that arrive at the victim antenna. The sensing antenna receives these interfering signals, and transmits information about these signals to a controller that is operable communication with the auxiliary antenna system. The controller provides a signal to the auxiliary antenna that causes the auxiliary antenna to transmit a signal to the victim antenna that substantially cancels out the interfering signal from the main antenna. For example, the controller may adjust the amplitude, phase, polarization, and or frequency characteristics of the signal transmitted from the auxiliary antenna system so as to reduce the sum of the interference and the auxiliary signal received by the sensing antenna. As such, interference to the victim antenna may be reduced adaptively without the need to modify the victim antenna or limiting its operation.

Under one aspect, a system for reducing interference generated by a main antenna and received by a victim antenna includes: an auxiliary antenna system co-located with the main antenna, the auxiliary antenna configured to transmit an auxiliary signal to the victim antenna; a sensing antenna located on a line-of-sight path between the transmission antenna and the victim antenna, the sensing antenna configured to receive a composite of the interference and the auxiliary signal, and to output a first signal based on the received composite; a controller comprising an input coupled to the sensing antenna and configured to receive the first signal, the controller being configured to adjust at least one of an amplitude, a phase, a polarization, and a frequency characteristic of the auxiliary signal based on the first signal so as to reduce the composite of the interference and the auxiliary signal received by the sensing antenna.

In some embodiments, the main antenna generates a main signal and is configured to output a second signal based on the main signal, and wherein the controller is further configured to receive the second signal. The controller may include a correlator configured to cross-correlate the first signal and the second signal and to output third and fourth signals based on the cross-correlation. These third and fourth signals are the orthogonally polarized samples of the composite signal from the main antenna's sidelobe and the auxiliary antenna system. The correlator operates with the sample of the signal from the transmission antenna and the signals received by the main and auxiliary antenna system. Other signals in the environment, such as those intended for the victim antenna, are not coherent with the signals from the main and auxiliary antennas. Consequently, the correlation outputs depend on only the interfering signals from the main and auxiliary antennas so that the controller does not respond to other signals in the environment. The correlation outputs are an "error signal" in a control system sense, and the controller functions to minimize the error thus reducing the power density of the composite signal and hence the interference received by the victim antenna. The controller thus may include a processor configured to receive the third and fourth signals and compute an error value based on the third and fourth signals. The processor may be further configured to obtain a weighting coefficient that reduces the computed error value. The controller may further include an output coupled to the auxiliary antenna, the processor providing the weighting coefficient to the auxiliary antenna via the output, the provided weighting coefficient adjusting one or more characteristics of the auxiliary signal.

Some embodiments include a plurality of auxiliary antennas. At least one auxiliary antenna of the plurality may be a different type of antenna than at least one other auxiliary antenna of the plurality. For example, at least one auxiliary antenna of the plurality comprises a reflector antenna positioned behind the main antenna, and at least one other auxiliary antenna of the plurality comprises a horn antenna. The plurality of auxiliary antennas may be mounted to a frame to which the main antenna is mounted.

Under another aspect, a method for reducing interference generated by a main antenna and received by a victim antenna includes: co-locating an auxiliary antenna with the main antenna; locating a sensing antenna on a line-of-sight path between the main antenna and the victim antenna; transmitting an auxiliary signal from the auxiliary antenna to the victim antenna; receiving with the sensing antenna a composite of the interference and the auxiliary signal; and based on a sample of the received composite, adjusting at least one of an amplitude, a phase, a polarization, and a frequency characteristic of the auxiliary signal so as to reduce the composite of the interference and the auxiliary signal received by the sensing antenna.

In practice, a threshold level of interference may be established that allows acceptable operation of the victim's system. The cross correlation product is a measure of the incident power density of the composite signal from the main antenna and the auxiliary antenna system. This measured cross correlation level may be compared to the a priori determined threshold level to determine compliance with the required interference suppression from the main antenna and its adaptively controlled auxiliary antenna. This cross correlated output may be recorded as a function of time to document compliance during the periods of operation of the main antenna.

DETAILED DESCRIPTION

Overview

Embodiments of the present invention provide systems and methods for protecting a victim antenna from interference by a transmission antenna. As described in greater detail below, an auxiliary antenna is co-located with the transmission antenna, and a sensing antenna is located on the line-of-sight between the transmission and victim antennas. The sensing antenna is configured so as to receive approximately the same signals as does the victim antenna. As the transmission antenna transmits a signal to a target, the sensing antenna receives approximately the same amplitude, phase, polarization, and frequency content of interference as does the victim antenna. Based on the interference received by the sensing antenna, the auxiliary antenna generates a signal that reduces or cancels that interference, without significantly impairing the main signal transmitted from the transmission antenna to its target. Coordination between the sensing and auxiliary antennas may be achieved using a controller in operable communication with the two antennas, that cross-correlates the signal received by the sensing antenna with the signal generated by the auxiliary antenna, and that modifies the signal generated by the auxiliary antenna so as to reduce or minimize the cross-correlation.

The systems and methods provided herein usefully may be employed by an entity broadcasting a signal that undesirably interferes with one or more receiving antennas. Such an entity may, for example, be motivated to cancel that interference as completely as possible, with little to no burden on the owners/operators of the receiving antennas. In accordance with one aspect of the present invention, the sensing antenna is located on the line-of-sight path between the transmission and the victim antenna and thus may provide a far more accurate sample of the interfering signals received by the victim than achievable under the '845 patent, in which antenna elements positioned with the main antenna are used to sample the interference. Further in accordance with the present invention, here the owner/operator of the victim receiving antenna need not take any positive action for interference at the victim antenna to be reduced, let alone undergo a radical modification of the victim antenna, whereas under the '308 patent, the receiving antenna must be significantly modified so as to reduce received interference, thus imposing a burden on the owner/operator of the receiving antenna.

First, an exemplary system, and a method that may be executed using such a system, will be described. Further below, some examples of alternative embodiments will be provided.

System

Figure 1:
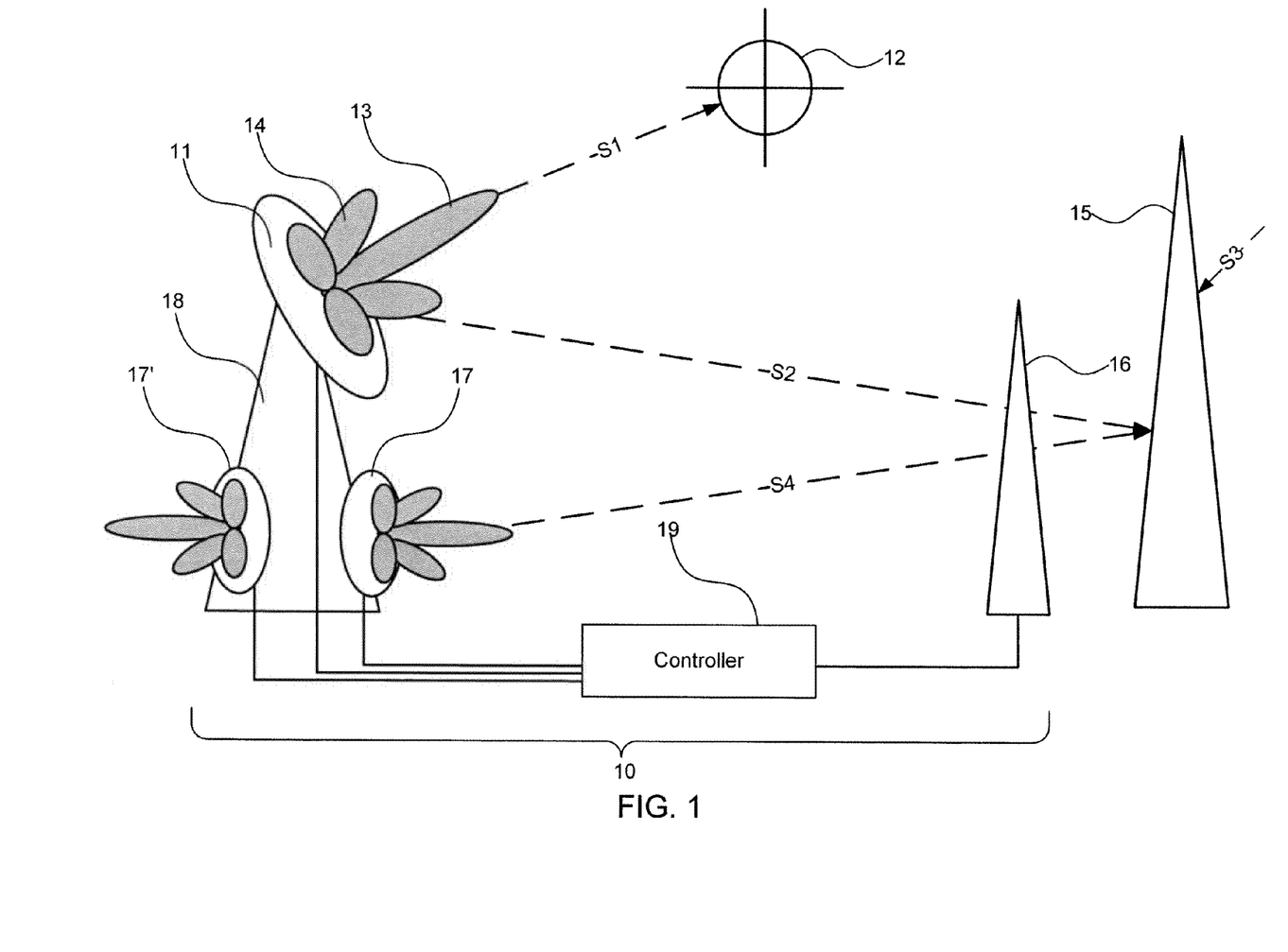
FIG. 1 schematically illustrates a system for protecting a victim antenna from interference by a main antenna, according to some embodiments of the present invention.

FIG. 1 schematically illustrates the components of a system 10 for reducing interference generated by main transmission antenna 11, transmitting a main signal to target receiving antenna 12, and received by victim antenna 15 which is located at a fixed location. System 10 includes main antenna 11, auxiliary transmission antennas 17 and 17', which are co-located with main antenna 11, sensing antenna 16, which is located on the line-of-sight path between the transmission antenna 11 and the victim antenna 15, and controller 19, which is in operable communication with main antenna 11, auxiliary transmission antennas 17, 17' and sensing antenna 16. Note that in the illustrated embodiment, victim receiving antenna 15 and target receiving antenna 12 are not considered to be part of system 10. Indeed, victim receiving antenna 15, and target receiving antenna 12 may each be owned and/or operated by entirely different entities from one another, and from system 10. Of course, in some embodiments, one or more of main antenna 11, victim antenna 15, target antenna 12, and system 10 are owned/operated by the same entity. For example, system 10 may in some embodiments be considered also to include one or more of victim antenna 15, and target antenna 12. Alternatively, in some embodiments, system 10 is not considered to include main antenna 11.

Main transmission antenna 11 may be any suitable antenna configured to transmit a main signal S1 to target receiving antenna 12. For example, in the illustrated embodiment, main antenna 11 is a large, ground terminal, reflector antenna mounted on frame 18 and configured to direct a main lobe 13 of signal S1 toward target antenna 12. Target antenna 12 may be any suitable terrestrial or non-terrestrial antenna, e.g., a satellite antenna as illustrated in FIG. 1. As is familiar to those of ordinary skill, the main lobe 13 of main signal S1 also is also accompanied by sidelobes 14 directed in a variety of directions other than toward target antenna 12. These sidelobes 14 also illuminate victim antenna 15, and their level may vary as main antenna 11 is repositioned to follow changes in the location of target antenna 12. Victim antenna 15 may be any suitable antenna configured to receive signal S3 from separate transmission sources (not shown). If the operating frequency bands of victim antenna 15 and main antenna 11 overlap, that is, if desired signal S3 and interfering signal S2 contain frequency components in common, then signal S2 may detrimentally affect the ability of victim antenna 15 to satisfactorily receive desired signal S3. For example, victim antenna 15 may receive the sum of signals S2 and S3, but may be unable to discriminate between the two. As such, the presence of signal S2 degrades the performance of victim antenna 15 with respect to signal S3. In practice, a threshold level of signal S2 may be established that allows acceptable reception of signal S3. Commonly, this threshold level is a predetermined signal to noise plus interference ratio (SNIR), where S is the level of the desired victim signal S3, noise is the system noise temperature of the victim's system, and I is the interference from the main antenna that is adaptively reduced by the signals from the auxiliary antenna system 17 and 17'.

System 10 is configured to reduce the effect of interfering signal S2 on the performance of victim antenna 15. Specifically, sensing antenna 16 is located on the line-of-sight path between the transmission antenna 11 and the victim antenna 15 so as to receive a representative sampling of the signals received by victim antenna 15, e.g., signals S2, S3, and S4. Auxiliary transmission antennas 17, 17' are co-located with main antenna 11 so as to generate an auxiliary signal S4 that reduces the detrimental effect of interfering signal S2 on the operation of victim antenna 15. In the illustrated embodiment, auxiliary transmission antennas 17, 17' are coupled to frame 18, so that if frame 18 rotates main antenna 11 so as to adjust the direction of main signal S1, auxiliary antennas 17, 17' are rotated likewise. Controller 19, which is in operable communication with sensing antenna 16, auxiliary antennas 17, 17', and main antenna 11, adjusts the amplitude, phase, polarization, and/or frequency characteristics of signal S4 so as to reduce the sum of signals S2 and S4 received by sensing antenna 16, and thus also reduce the sum of signals S2 and S4 received by victim antenna 15. Such adjustment may be performed once, may be updated periodically, or may even be updated continuously, so as to adaptively and dynamically reduce the effect of interfering signal 12 on the performance of victim antenna 15. Continuous updates may be required when main antenna 11 is repositioned to respond to changes in the location of the target receiving antenna 12, in accordance to the angular variation of the sidelobes 14 of main antenna 11. Note that because interfering signal S2 may include a mixture of orthogonally polarized signal components, preferably sensing antenna 16 and auxiliary antennas 17, 17' are configured and calibrated to respectively sense and generate a mixture of orthogonally polarized signal components.

Sensing antenna 16 is usefully positioned at a location that is sufficiently remote from main antenna 11, and sufficiently close to victim antenna 15, to obtain a representative sampling of the different signals S2, S3, S4 incident on the victim antenna. For example, sensing antenna 16 may be positioned at a similar elevation as victim antenna 15 with a limited azimuth coverage that would encompass potential multipath sources. The composite signal contributions (S2+S3+S4) and the incident power density at victim antenna 15 and sensing antenna 16 may be corrupted by multipath. Such multipath contributions may in some circumstances complicate the cancellation of interfering signals, so preferably both victim antenna 15 and sensing antenna 16 are positioned in locations that reduce multipath interference. Additionally, the antenna gain and electronics insertion gain of sensing antenna 16 are preferably calibrated, so as to enhance the antenna's measurement of the composite signal contributions to allow comparison with the predetermined threshold SNIR value, upon which controller 19 bases the interference-reducing signals generated by auxiliary antennas 17, 17', as described in greater detail below. Note that it is assumed that sensing antenna 16 does not receive significant contributions from main signal S1, which is directed toward target antenna 12.

Auxiliary antennas 17, 17' may include any suitable transmission antennas, and may be mounted to the same frame 18 as is main antenna 11, so as to maintain alignment between signal S4 generated by auxiliary antenna 17, 17' and interference signal S2 from sidelobes 14 generated by main antenna 14. For example, if frame 18 rotates main antenna 11 to point at a new target, then frame 18 also may simultaneously rotate auxiliary antennas 17, 17' by the same amount. Auxiliary antennas 17, 17' also are usefully configured to generate an auxiliary signal S4 that does not significantly affect the effective radiated power (ERP) of main signal S1 from main lobe 13 generated by main antenna 11. Although the gain of sidelobes 14 is lower than the gain of main lobe 13, auxiliary signal S4 coherently interacts both with main signal S1 and interfering signal S2. The amplitude of auxiliary signal S4 is preferably maintained at a sufficiently low level that main signal S1 is not significantly spectrally degraded. That is, auxiliary signal S4 from auxiliary antennas 17, 17', which may be viewed as multipath signal components that may potentially interfere with main signal S1 from main antenna 11, is sufficiently low that signal S1 received by target antenna 12 is not significantly degraded. In one example, auxiliary signal S4 is maintained at a sufficiently low amplitude that signal S1 received by target antenna 12 is degraded by less than a bit error rate (BER) basis, e.g., changes in signal S1 resulting from the illumination of auxiliary antenna signal S4 in the direction of target receiving antenna 12 have a low or minimal impact on the bit error rate at the target receiving antenna as determined by the threshold SNIR value. As such, auxiliary signal S4 may be viewed as causing at most a minor perturbation on main signal S1. Various issues associated with perturbations of main signal S1 are described in greater detail below.

Figure 2:
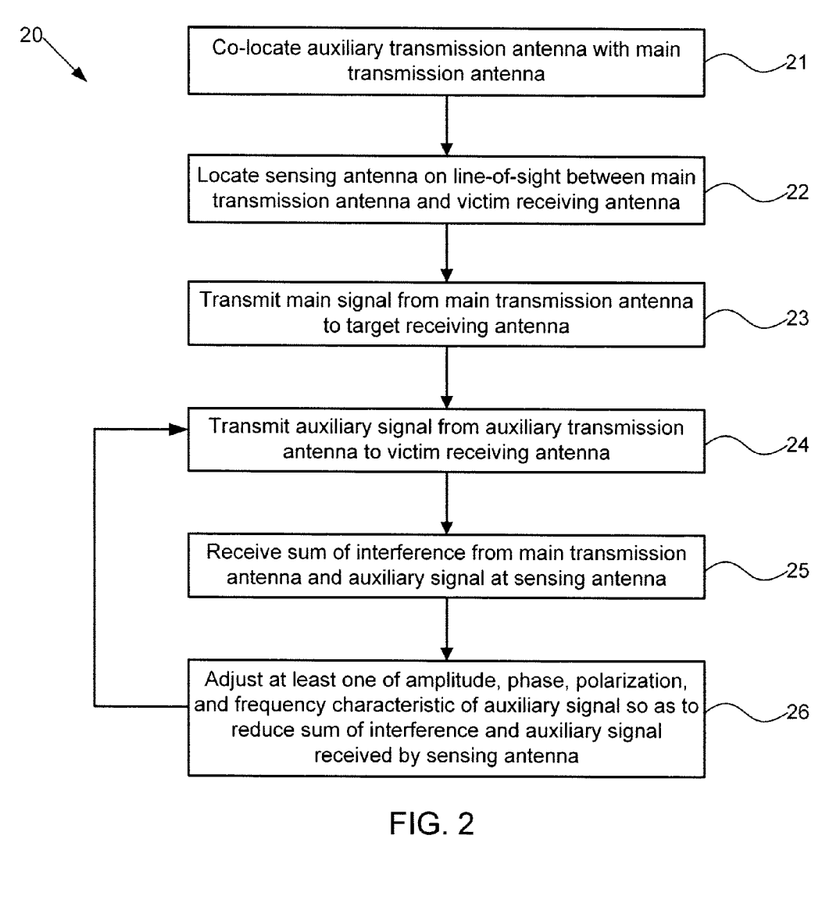
FIG. 2 illustrates steps in a method of protecting a victim antenna from interference by a main antenna, according to some embodiments of the present invention.

FIG. 2 illustrates steps in an illustrative method 20 of reducing interference generated by a main transmission antenna and received by a victim receiving antenna. Method 20 may, for example, be implemented using system 10, although the method is not limited thereto.

Method 20 includes co-locating an auxiliary transmission antenna with the main transmission antenna (21). For example, as illustrated in FIG. 1, auxiliary antenna 27 may be coupled to the support structure 18 of main antenna 11 in such a way that repositioning the main antenna simultaneously repositions the auxiliary antenna in a corresponding manner. Optionally, a plurality of co-located auxiliary transmission antennas 27, 27' may be provided in step 21. Exemplary configurations for the auxiliary antenna(s) are provided further below.

Method 20 further includes locating a sensing antenna on a line-of-sight path between the main transmission antenna and a victim receiving antenna (22). For example, as illustrated in FIG. 1, sensing antenna 16 is positioned relative to victim antenna 15 so as to sample substantially all of the interference signal S2 from main antenna 11, and substantially all of the auxiliary signal S4 from auxiliary antenna 17, that is received by the victim antenna 15. For example, the sensing antenna may be positioned in direct contact with the victim antenna, or may be positioned adjacent to the victim antenna, or may be positioned some distance away from the victim antenna but along the line of sight between the main and auxiliary antennas and the victim antenna. Satisfactory positions for the sensing antenna may be selected depending upon the particular geography of the areas in which the main, auxiliary, and victim antennas are situated, cooperation of the owner/operator of the victim system, and the characteristics of these antennas.

Method 20 also includes transmitting a main signal (e.g., signal S1 illustrated in FIG. 1) from the main transmission antenna to a target receiving antenna (23). Even if the main lobe of such a transmission is directed at the target antenna, sidelobes of the transmission may be directed in a variety of directions, and may impinge upon the victim antenna causing interference (e.g., signal S2 illustrated in FIG. 1).

Method 20 additionally includes transmitting an auxiliary signal from the auxiliary transmission antenna to the victim receiving antenna (24). For example, as illustrated in FIG. 1, auxiliary antenna 17 transmits signal S4 to victim antenna 15. A baseline amplitude, phase, polarization, and frequency content may be initially selected for the auxiliary signal, e.g., based on the expected level of interference at the victim antenna as a function of the main signal. This baseline estimate may be derived from analysis codes for the main antenna or from measurements on a scaled or actual antenna. As described in greater detail below, in subsequent steps the characteristics of this auxiliary signal may be adjusted using adaptive circuitry so as to reduce the amount of interference that the interfering main signal causes to the victim antenna. Preferably, transmitting the auxiliary signal from the auxiliary transmission antenna does not significantly impact the transmission of the main signal from the main transmission antenna to the target receiving antenna.

Method 20 further includes receiving the sum of the interference from the main transmission antenna and the auxiliary signal at the sensing antenna (25). Because the sensing antenna (e.g., antenna 16 illustrated in FIG. 1) is positioned so as to sample substantially all of the interference from the main antenna (e.g., antenna 11) and substantially all of the auxiliary signals that are experienced by the victim antenna (e.g., antenna 15), the received sum approximates the corresponding sum received by the victim antenna. The coherent sum of the signals from the main antenna sidelobes and adaptively weighted auxiliary antenna system results in a received power density by the sensing antenna that is on the line-of-sight path to the victim antenna. The reduction of the power density in the direction of the victim antenna reduces the interference power received by the victim system.

Method 20 also includes adjusting at least one of the amplitude, phase, polarization, and frequency characteristics of the auxiliary signal so as to reduce the sum of the interference and the auxiliary signal received by the sensing antenna (26). Because the sensing antenna is located on the line-of-sight path between the transmission antenna and the victim receiving antenna, such an adjustment also reduces the sum of the interference and the auxiliary signal received by the victim antenna, i.e., reduces the detrimental impact of the interference on the operation of the victim antenna, without requiring any action by the owner/operator of the victim antenna.

Further detail of the different components of system 10 illustrated in FIG. 1, and their functionalities, will now be provided.

Figure 3:
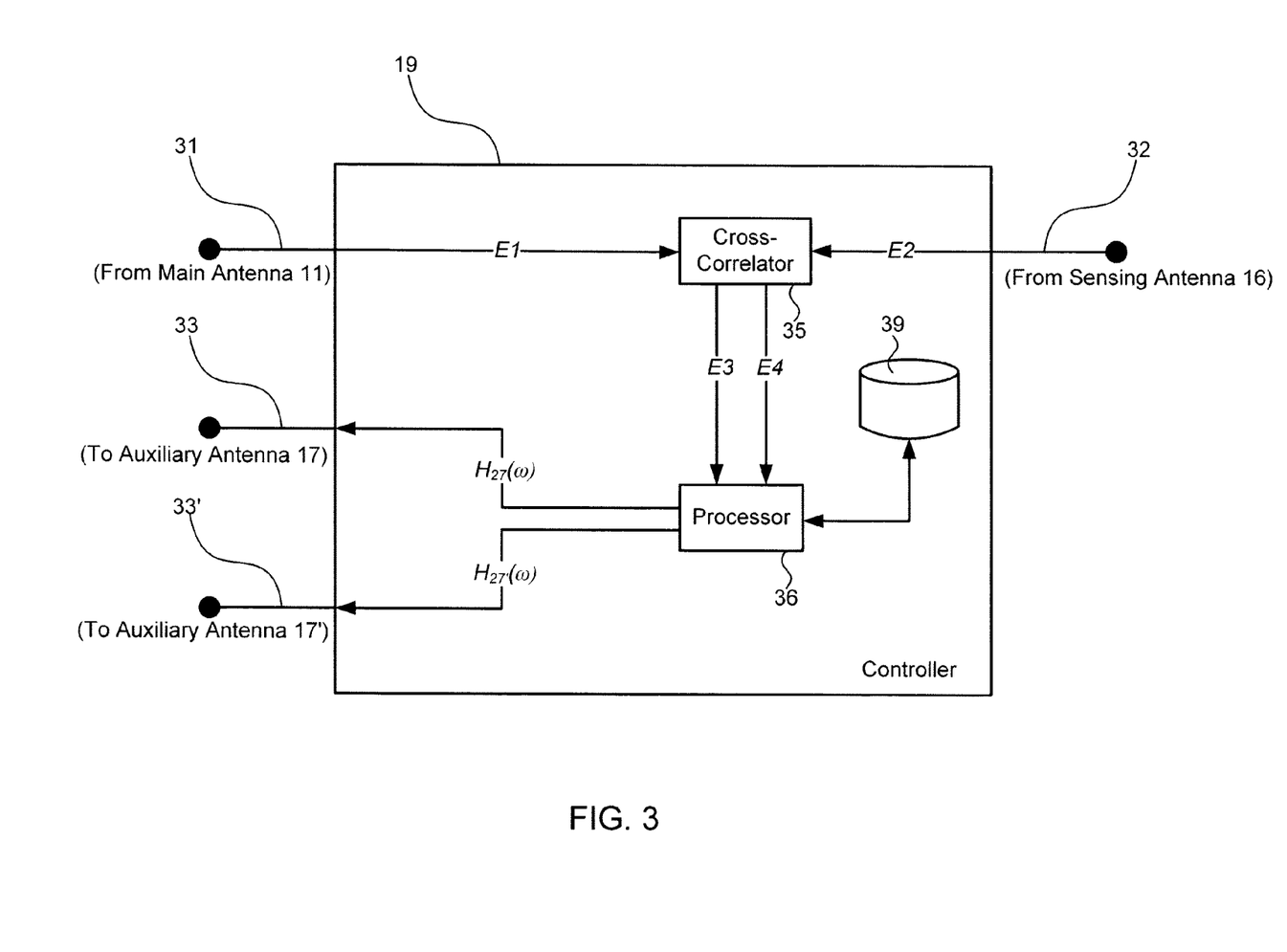
FIG. 3 schematically illustrates a controller for use in a system for protecting a victim antenna from interference by a main antenna, according to some embodiments of the present invention.

FIG. 3 schematically illustrates controller 19, which is in operable communication with main antenna 11, sensing antenna 16 and auxiliary antennas 17, 17' illustrated in FIG. 1. Controller 19 includes main antenna input 31, sensing antenna input 32, auxiliary antenna output 33, cross-correlator 35, and processor 36. Controller 19 may be co-located with sensing antenna 16, or may be co-located with auxiliary antennas 17, 17', or may be positioned at any other suitable location. A storage capability 39 is included that stores instructions for the processor 36, a priori data on the antenna responses for use in establishing the adaptive weighting values $H(\omega)$, and storage of the time record of the cross correlation levels E3 and E4 (described below) that are proportional to the incident power density from the main and adaptively weighted antenna that may be compared with the predetermine threshold level and recorded to document compliance.

Controller 19 includes main antenna input 31 at which it receives a signal sample E1 that is to be transmitted by the main antenna 11 to the target antenna 12. Signal sample E1 is coherent with the signals S1 and S2 radiated by main antenna 11 and the signal S4 that is adaptively weighted and radiated by the auxiliary antennas 17 and 17'. Signal E1 may be an electronic representation of the signals generated by main antenna 11, or may be a sampling of the signals carried by fiber optics. For example, the transmitter of main antenna 11 may include an output coupler (not illustrated) that is positioned after the transmitter of main antenna 11 and output filtering, and that provides first signal E1 representative of that sample to main antenna input 31. Such an output coupler of main antenna 11 may be coupled to main antenna input 31 of controller 19 via any suitable connection, e.g., by a wired connection, by fiber optics, or by a wireless connection. Main antenna input E1 is operatively coupled to cross-correlator 35, described in greater detail below.

Controller 19 also includes sensing antenna input 32 at which it receives a second signal E2 received by sensing antenna 16 that includes a representation of the composite signal from the sidelobes 14 of the main antenna S2, the adaptively weighted signal S4 from the auxiliary antennas 17 and 17, the signal collection S3 intended to be received by the victim antenna 15, and thermal noise components (not shown). Signals S2 and S4 are coherently related to the signal sample E1 obtained from the transmitter of main antenna 11 and coherently related to the signal S1 transmitted to target antenna 12. The signal collection S3 intended for the victim receiver and the thermal noise components are not coherently related to the signals S1, S2, and S4; as a consequence, the outputs E3 and E4 of the cross correlator have no response to S3 or to the thermal noise components. The second signal E2 also includes a representation of the adaptively weighted auxiliary signal S4 received by sensing antenna 16. This component of the second signal E2 includes a representation of the frequency-dependent sum of the different sidelobe signal contributions and is coherently related to the signal S2 and S1. However, this component S4 may have different amplitudes and time delays depending on their path to sensing antenna 16. Specifically, the frequency-dependent sum $A_S(\omega)$ of the different sidelobe signal contributions m received by sensing antenna may be expressed as:

$$A_S(\omega) = \Sigma K_m (G_m)^{1/2} \exp(j\alpha_m) \exp(j\omega t_m) S(\omega - ct_m) \quad (1)$$

where $K_m$ is a normalizing coefficient based on the gain of sensing antenna 16 for sidelobe signal contribution m, and $G_m$, $\alpha_m$, $\omega$, $t_m$, and S are as defined above. Note that $A_M(\omega)$ and $A_S(\omega)$ primarily differ in that the latter includes normalizing coefficients and an additional time delay component that accounts for the time that signal contribution m takes to travel from the auxiliary antenna system 17 and 17' to sensing antenna 16.

The second signal E2 includes signal component S2 radiated by antenna sidelobes 14 in the direction of sensing antenna 16 and victim antenna 15. Signal E2 includes a representation of a plurality of signal contributions m from interfering signal S2 generated by sidelobes 14. The frequency-dependent sum of the different sidelobe signal contributions, $A_M(\omega)$, may be expressed as:

$$A_M(\omega) = \Sigma (G_m)^{1/2} \exp(j\alpha_m) \exp(j\omega t_m) S(\omega) \quad (2)$$

where $G_m$ is the relative gain level (amplitude) of one of the signal components m, $\alpha_m$ is the relative phase of that component, $\omega$ is the frequency (in radians), $t_m$ is the time delay of the sidelobe signal component relative to a common reference point, and $S(\omega)$ is the signal spectrum. The signal components m generated by sidelobes 14 each are coherent with the main signal S1 generated by main lobe 13, and may come from a variety of sources, including but not limited to aperture illumination, edge diffraction, feed spillover, radiation, and blockage, scattering from the structural components of antenna frame 18, and leakage through panels that form the surface of main antenna 11.

The response of the auxiliary antenna system $A_S(\omega)$ is adaptively weighted by values determined by the processor 36 to produce a response having a representation of the frequency-dependent sum of the different auxiliary signal contributions $A_A(\omega)$ generated by auxiliary antennas 17, 17', which may be expressed as:

$$A_A(\omega) = \Sigma K_n (G_n)^{1/2} \exp(j\beta_n) \exp(j\omega t_n) S(\omega - ct_n) H_n(\omega) \quad (3)$$

where $K_n$ is a normalizing coefficient based on the gain of sensing antenna 16 for the signal generated by auxiliary antenna n, $G_n$ is the relative gain level (amplitude) of the response of that auxiliary antenna, $\beta_n$ is the relative phase of the response of the signal generated by that antenna, and $t_n$ is the time delay for that antenna's signal relative to the same time as the delay components of the main antenna. The $H_n(\omega)$ term is an adaptive weighting coefficient that controller 19 imposes on antenna n so as to adaptively reduce the effect of interference signal S2 on victim antenna 15. The adaptive weighting values produced by the processor are selected to replicate or approximate the response of the main antenna's sidelobes $A_M(\omega)$. When this replication is accomplished, the subtraction of the main antenna's sidelobe response and the adaptively weighted auxiliary antenna system's response will cancel, and the interference illumination of the victim antenna 15 is minimized or reduced.

Specifically, controller 19 includes cross-correlator 35 configured to cross-correlate signals E1 and E2 together to obtain signal E3 that is proportional to the composite signal from the transmission antenna and the auxiliary antenna signals that are weighted by the adaptive weighting value $H_n(\omega)$. Note that the correlation output is a dc value, and that the E3 and E4 outputs represent the correlation with orthogonally polarized components of the E1 signal. The signals in E2 include the composite signals from the main and auxiliary antennas that have a coherent relationship and the sampled signal from the main antenna E1 is also coherent to the composite signal. Other signals in the environment received by the sensing antenna and thermal noise components are not coherent with the composite signal and the cross correlation of these other components is zero. This cross-correlation also measures the delay components needed to equalize the responses of main antenna 11 and auxiliary antennas 17, 17'. Signals E3 and E4 may be electronic signals that may be carried by fiber optics. Controller 19 also includes processor 36 configured to receive signals E3 and E4 and to determine, based on same, an error value $\epsilon$ expressed by the following equation:

$$\epsilon = A_S(\omega) - A_A(\omega) \quad (4)$$

Error value $\epsilon$ thus reflects the extent to which the sum of signal components $A_A(\omega)$ generated by auxiliary antennas 17, 17' and received by sensing antenna 16, i.e., auxiliary signal S4, cancels the sum of signal components $A_S(\omega)$ generated by main antenna 11 and received by sensing antenna 16, i.e., interfering signal S2. A threshold value for error value $\epsilon$ may be defined, below which auxiliary signal S4 is considered to satisfactorily cancel interfering signal S2. This threshold error value is determined based on the threshold SNIR required for the victim system to achieve satisfactory operation. Cross-correlator 35 and processor 36 may have any suitable architecture known in the art. In one example, processor 36 is a conventional microprocessor as may be used in a personal computer (PC). Cross-correlators are known in the art.

Processor 36 is further configured to obtain a set of adaptive weighting coefficients $H_n(\omega)$ based on signals E3 and E4 that reduce or minimize error value $\epsilon$. Processor 36 may obtain such coefficients using any suitable algorithms, for example a least-means-squared (LMS) algorithm as is known in the art. Note that signal E1 may be considered a priori knowledge of interfering signal S2 generated by main antenna 11, and may be used to reduce the amount of computational effort that would otherwise be required to obtain coefficients $H_n(\omega)$. Examples of the use of such a priori knowledge are described in greater detail in Dybdal et al., "DEADEN: A New Adaptive Cancellation Technique," 1995 *IEEE MILCOM Symposium Digest*, San Diego Calif., Paper C1.1, Nov. 5-8, 1995, and in U.S. Pat. No. 5,440,308, the entire contents of each of which are incorporated herein by reference. It is envisioned that such a priori knowledge may be used to deterministically establish an initial set of weighting coefficients $H_n(\omega)$ and delays, with subsequent adaptive refinement performed by processor 36 to suppress interfering signal S2 in the direction of victim antenna 16.

Figure 4:
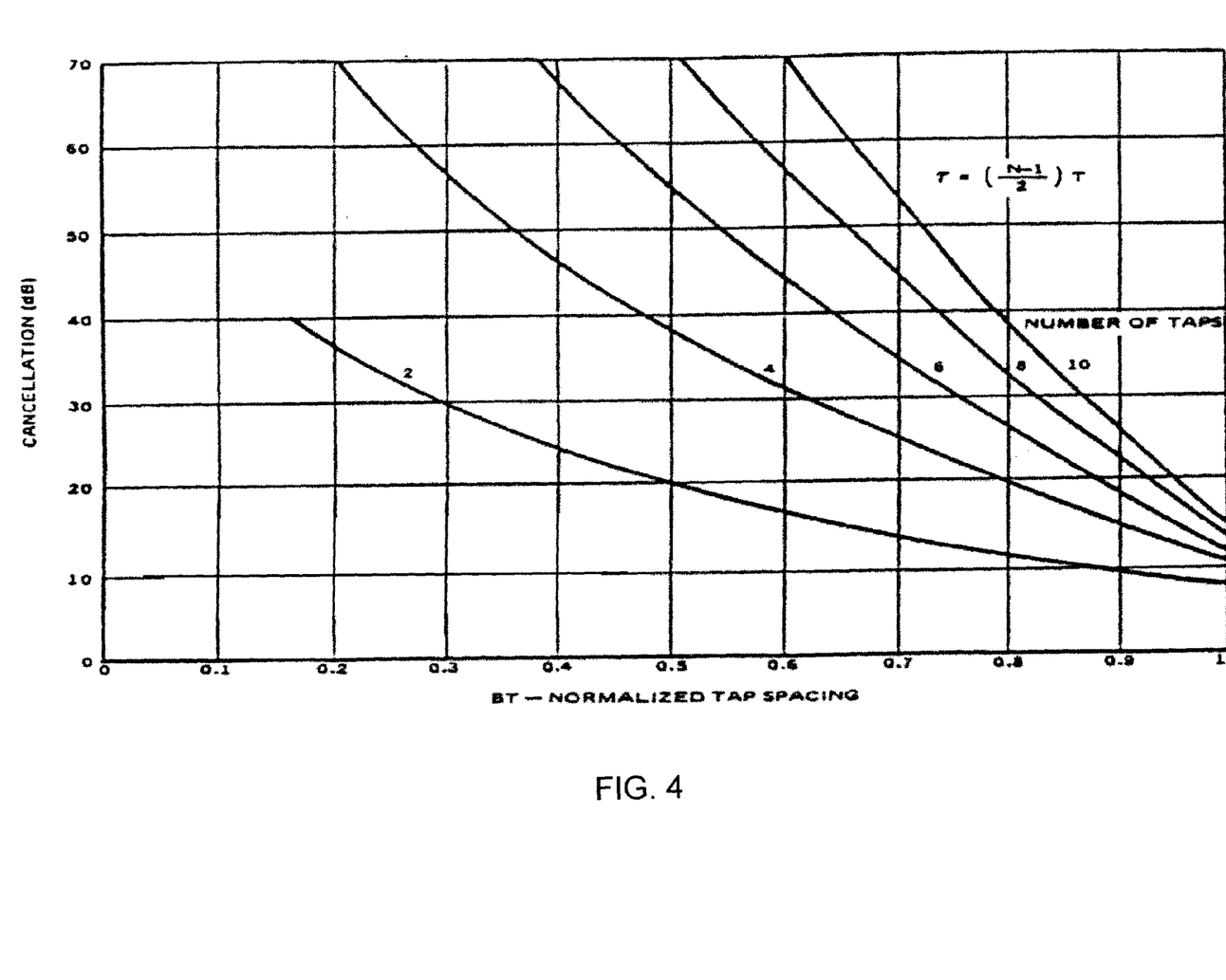
FIG. 4 is a plot of signal cancellation as a function of the time-bandwidth product for different numbers of taps.

As will be appreciated, the frequency response of main antenna's sidelobes 14 may differ from the frequency response of auxiliary antennas 17, 17'. To achieve satisfactory reduction of error value $\epsilon$ over the bandwidth of interfering signal S2 and auxiliary signal S4, in some embodiments processor 36 may include, or be in operable communication with, an adaptive transversal filter. As is known in the art, such a filter includes fixed tapped delay line circuitry with amplitude and phase control at each tap, to produce a frequency dependent adaptive weight that extends the cancellation bandwidth of the adaptive cancellation system. For example, FIG. 4 is a plot illustrating the relationship between the time-bandwidth product (BT) for an adaptive transversal filter and the degree of cancellation achievable with such a filter for a given number of taps. As may be seen in FIG. 4, the equalization requirements depend on BT where the time parameter is the delay spread of the main antenna's sidelobes and the bandwidth is the required cancellation bandwidth. The number of taps increases with the amount of desired cancellation and with the required bandwidth. For reflector antennas, it is known in the art that the time delay spread of the sidelobe structure is about 2.5 times the transit time across the antenna's aperture.

Referring again to FIG. 3, controller 19 includes auxiliary antenna outputs 33, 33' that are operatively coupled to processor 36 and to auxiliary antennas 17, 17', respectively. Auxiliary antenna outputs 33, 33' may be coupled to auxiliary antennas 17, 17' via any suitable connection, such as a wired connection, or a wireless connection. Based on the input of signals E3 and E4 into any suitable algorithm and/or adaptive transversal filter, processor 36 obtains a set of weighting coefficients $H_n(\omega)$ and provides such weighting coefficients to the appropriate auxiliary antenna outputs 33, 33'. For example, in the illustrated embodiment, processor 36 provides weighting coefficient $H_{27}(\omega)$ to auxiliary antenna output 33 in communication with auxiliary antenna 17, and provides weighting coefficient $H_{27'}(\omega)$ to auxiliary antenna output 33' in communication with auxiliary antenna 17. Such weighting coefficients modify the frequency-dependent amplitude of the signal components $A_A(\omega)$ generated by auxiliary antennas 17, 17', and thus modify the amplitude of auxiliary signal S4 received by sensing antenna 16 and victim antenna 15, reducing the effect of interfering signal on victim antenna 15. Note that in addition to weighting coefficients that modify the frequency-dependent amplitude of signal components generated by auxiliary antennas 17, 17', processor 36 may also, or alternatively, provide signals to auxiliary antenna outputs 33, 33' that modify one or more of the amplitude, phase and polarization of the signal components $A_A(\omega)$ generated by auxiliary antennas 17, 17'. For example, signal S2 has a mixture of polarization components, so preferably auxiliary antennas 17, 17' each have two orthogonally polarized outputs, the relative phase and amplitude of which may be adjusted by processor 36 such that auxiliary signal S4 has approximately the same polarization characteristics as interference signal S2.

Note that sensing antenna 16 receives not only signals transmitted by main antenna 11 and auxiliary antennas 17, 17', but also other signals in the environment, e.g., desired signal S3. The signal collection $S_C(\omega)$ received by sensing antenna 16 may be expressed as:

$$S_C(\omega) = S_1(\omega) + \Sigma S_E(\omega) \quad (5)$$

where:

$$S_1(\omega) = A_S(\omega) - H_n(\omega) A_A(\omega) \quad (6)$$

where $A_S(\omega)$, $H_n(\omega)$, and $A_A(\omega)$ are as defined above with respect to equations (2) and (3), and where $S_E(\omega)$ are the spectral characteristics of other external signal components received by sensing antenna 16, and which include normalizing coefficients $K_E$ based on the gain of sensing antenna 16 for those signals, analogous to the normalizing coefficients discussed above with respect to equations (2) and (3). However, the external signals characterized by $S_E(\omega)$ have no correlation to signal E1. Similarly, signals caused by thermal noise have no correlation to signal E1. As such, the correlation by cross-correlator 35 of first signal E1 from main antenna 21 and second signal E2 from sensing antenna 16 produces no correlation with the external signals. Therefore, processor 36 receives no information about such external signals, and the weighting coefficients $H_n(\omega)$ that processor 36 obtains and applies to auxiliary antennas 17, 17' will not significantly impede victim antenna 15 from receiving such external signals, e.g., desired signal S3.

In some embodiments, controller 19 further includes computer-readable storage medium 39. Storage medium 39 may store instructions for use by processor 36 for processing signals E3, E4, such as the algorithm used in such processing. The storage medium also may contain a priori data on the response of the main and auxiliary antennas over their angular extent that is used in predetermining the adaptive weighting values $H(\omega)$. Storage medium 39 also may store information about one or more of signals E1, E2, E3, and E4, and or error value $\epsilon$, as a function of time. Such information may be used, for example, to demonstrate how effectively auxiliary antennas 17, 17' cancel interfering signal S2 generated by main antenna 11 as a function of time. Comparison between the time varying error values with the predetermined threshold error value indicates compliance with requirements, and the time varying recording of the error values serves to document the compliance with requirements.

Figure 5:
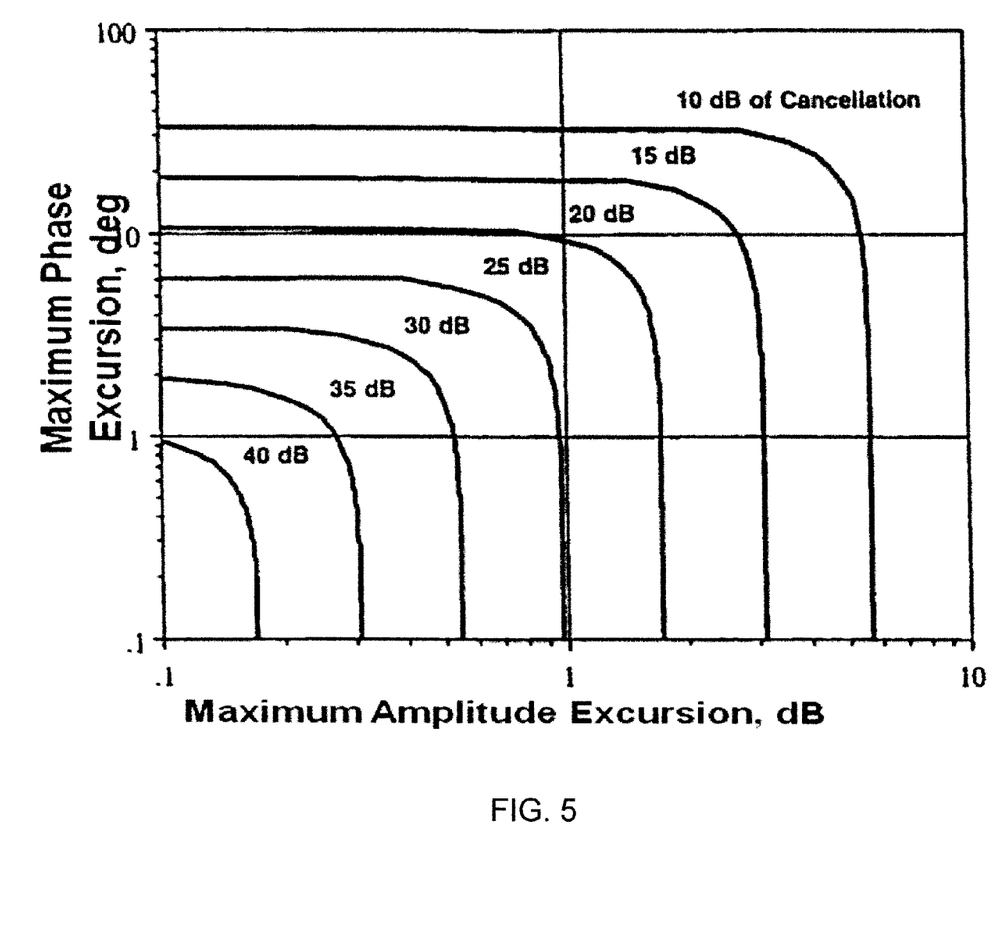
FIG. 5 is a plot of the maximum phase excursion as a function of maximum amplitude excursion for different levels of signal cancellation.

As will be appreciated, to satisfactorily cancel interfering signal S2 with auxiliary signal S4, certain amplitude and phase tolerances must be maintained over the operating bandwidth. FIG. 5 is a plot illustrating the amplitude and phase tolerance requirements for various levels of signal cancellation (in dB), calculated using techniques known in the art. Under various embodiments of the present invention, cancellation levels of between 20-40 dB are believed to provide satisfactory levels of cancellation, in particular between 25-30 dB.

Referring again to FIG. 3, the ability of controller 19 to accurately determine error value $\epsilon$, and thus determine the composite interference power depends in part on the insertion gain and stability of the electronics between main antenna input 31 and sensing antenna gain level 32. The gain of sensing antenna 16 in the direction of main antenna 11 may be measured and the insertion gain and cross correlation coefficient of the sensing antenna electronics may also be measured. This calibration results in establishing the power density of the incident composite interference signal and the cross correlation values E3 and E4. In this way, the cross correlation values may be compared with the predetermined threshold interference power density for acceptable operation of the victim antenna 15. This calibration thus provides a measure of the effectiveness of the adaptive cancellation in complying with requirements. Further, recording the time variation of the cross correlation levels documents compliance during periods that the main antenna is transmitting. The sensing antenna 16 is passive and its gain level may be measured. However, the insertion gain of the electronics may somewhat vary with time during operation, and calibration techniques may be used to characterize their variability. One such technique includes injecting calibration signals at main antenna input 31 and sensing antenna input 32 to measure the time-varying insertion gain values of the electronics. This technique usefully provides Built-in Test Equipment (BITE)

capabilities for the electronics associated with sensing antenna 16. If the stability of the insertion gain is characterized, an alternative is to select a threshold output correlation value margined by the insertion gain instability variation.

Note that the functionalities of cross-correlator 35 and processor 36 need not necessarily be provided in separate modules, but both may be performed by a single component of controller 19. For example, processor 36 may also provide the functionality of cross-correlator 35. Additionally, not all components of controller 19 necessarily need to be co-located. For example, cross-correlator 35 may be positioned in a separate location from processor 36. In one embodiment, cross-correlator 35 is co-located with sensing antenna 16, while processor 36 is positioned in a different location.

Some design considerations for auxiliary antennas 17, 17', illustrated in FIG. 1, will now be provided.

Preferably, auxiliary antennas 17, 17' are configured to provide gain levels that meet or exceed the gain levels of sidelobes 14. Auxiliary antennas 17, 17' may be positioned so as to enhance the cancellation of interference signal S2. For example, one or more of auxiliary antennas 17, 17' may be mounted on the same side of frame 18 as is main antenna 11, and one or more of auxiliary antennas 17, 17' may be mounted on the opposite side of frame 18 as is main antenna 11. In the illustrated embodiment, auxiliary antenna 17 is mounted on the same side of frame 18 as is main antenna 11, and auxiliary antenna 17' is mounted on the opposite side of frame 18 as is main antenna 11.

Additionally, auxiliary antennas 17, 17' may be configured to cancel different signal contributions from sidelobes 14 than one another, and thus may have different designs than one another. For example, in some embodiments, sidelobes 14 may include wide-angle sidelobes bounded by an isotropic gain level and having amplitudes significantly lower than that of main signal S1, as well as sidelobes that are relatively close to main lobe 13 and having a higher amplitude than the wide-angle sidelobes. To cancel signal contributions from wide-angle, low-amplitude sidelobes 14, auxiliary antenna 17' may be configured as, for example, a horn radiator. Such a horn radiator preferably is configured such that the component of auxiliary signal S4 that it generates does not contain significant multipath contributions resulting from reflections from frame 18. For example, horn radiators may be configured to reduce the generation of backlobes, using any suitable feature known in the art, e.g., by including a choke or a rolled edge, or by utilizing observer tunneling.

Additionally, or alternatively, to cancel signal contributions from sidelobes 14 that are nearer to main signal lobe 13 and have a higher amplitude, auxiliary antenna 17 may be configured as a reflector antenna having smaller diameter than main antenna 11, in one example having a diameter approximately 1/10th that of main antenna 11. Such an auxiliary antenna 17 may be positioned, for example, behind the reflector of main antenna 11, so as to bring the phase centers of main antenna 11 and auxiliary antenna 17 relatively close to one another and thus reduce the effects of coherent interaction variations over the bandwidth. Specifically, because the amplitudes of sidelobes 14 nearer to main lobe 13 are higher than those at wider angles, auxiliary antenna 17 must generate higher ERP levels to cancel signals from such sidelobes. Coherent interactions between main antenna 11 and auxiliary antenna 17 may affect the ERP of main signal S1, which may be addressed by adjusting the magnitude and time delay of signals generated by auxiliary antenna 17.

Figure 6:
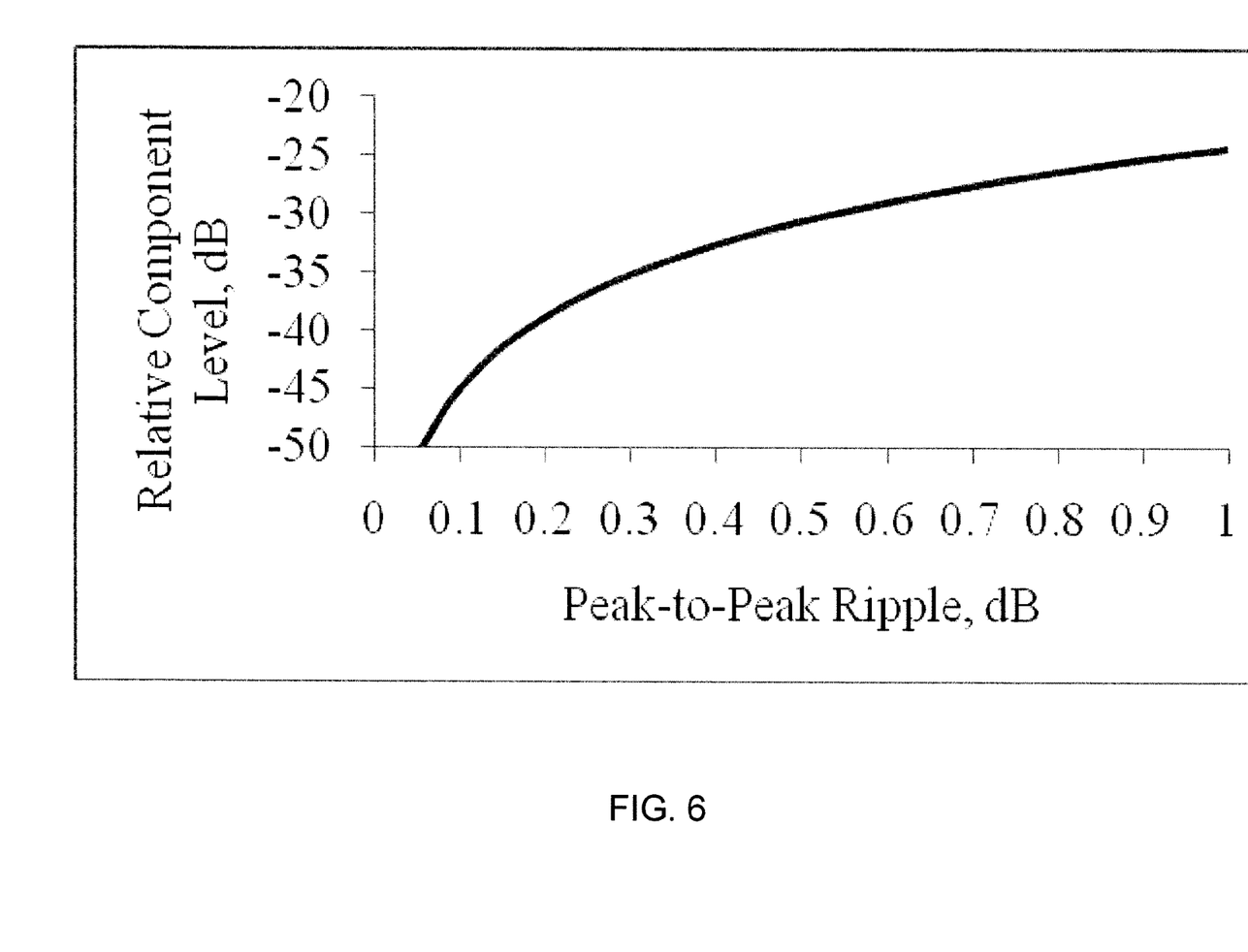
FIG. 6 is a plot of the relationship between peak-to-peak ripple and the relative level of signal components, e.g., main signal and auxiliary signal, received by a target antenna.

The coherent interaction between main signal S1 from main antenna 11 and auxiliary signal S4 from auxiliary antennas 17, 17' may be characterized using any suitable technique known in the art. In some circumstances, the phasing between main signal S1 and auxiliary S4 may vary over the bandwidth of main antenna 11 and auxiliary antennas 17, 17', resulting in ripple that degrades the operation of target antenna 12. For example, although target antenna 12 primarily receives main signal S1 from main antenna 11, it may also receive some component of auxiliary signal S4 from auxiliary antennas 17, 17' that interacts coherently with main signal S1. The level of acceptable ripple for target antenna 12 within a given spectral band may be defined as a system specification for that antenna. As illustrated in FIG. 6, the peak-to-peak ripple value experienced by target antenna 12 depends on the relative levels of the components received by that antenna, e.g., signals S1 and S4. The amount of ripple for a signal of given bandwidth depends on the time delay between those components. For example, a full cycle of the ripple may be provided by a physical separation distance L between the phase components equal to:

$$L = 984.3/\Delta f \qquad (7)$$

where $\Delta f$ is the frequency bandwidth in MHz, and physical separation distance L is in units of feet.

Some numerical examples may illustrate such transmission characteristics. For example, if target antenna 12 has system specifications requiring the peak-to-peak perturbation of main signal S1 generated by main antenna 11 to be less than 0.1 dB, then the amount of auxiliary signal S4 generated by auxiliary antennas 17, 17' that is received by target antenna 12 must be about 44 dB lower than signal S1. Or, for example, if target antenna 12 has system specifications requiring the peak-to-peak perturbation of main signal S1 to be less than 0.5 dB, then the amount of auxiliary signal S4 that is received by target antenna 12 must be about 30.5 dB lower than signal S1. Or, for example, if target antenna 12 has system specifications requiring the peak-to-peak perturbation of main signal S1 to be less than 1 dB, then the amount of auxiliary signal S4 that is received by target antenna 12 must be about 24 dB lower than signal S1.

The possibility of target antenna 12 observing a full cycle of ripple depends on the bandwidths of main signal S1 and auxiliary signal S4. For example, if the bandwidth $\Delta f$ of signals S1 and S4 is 4 MHz, then equation (7) provides that the required separation between the radiating phase centers is 246 feet. If, for example, the phase variation caused by auxiliary signal is to be limited to 1/10 of the full cycle of ripple, then the required separation is 1/10 of the above value, i.e., 24.6 feet. Auxiliary antennas 17, 17' may be suitably arranged so as to reduce the distance between antennas 17, 17' and main antenna 11. For example, as noted above, in some embodiments auxiliary antenna 17 may be positioned behind the reflector of main antenna 11.

For embodiments in which the signals have narrower bandwidth (e.g., less than 4 MHz) and in which the phase centers of auxiliary antennas 17, 17' and main antenna 11 are positioned closer than distance L from one another, then a relatively small fraction of the full ripple cycle will occur. In such embodiments, the ERP levels of main signal S1 will be perturbed by contributions from auxiliary signal S4. As is familiar to those of ordinary skill, the phases of the sidelobes 14 of main antenna 11 (illustrated in FIG. 1) alternate; thus, if main lobe 13 has a positive phase, then the sidelobes 14 nearest main lobe 13 have a negative phase, the next nearest sidelobes 14 have a positive phase, and so on. Components of auxiliary signal S4 that are intended to cancel negative-phase sidelobes 14 have a positive phase, while components of signal S4 intended to cancel positive-phase sidelobes have a negative phase. Thus, different components of auxiliary signal S4 may coherently interact differently with main signal S1, e.g., may enhance or degrade the ERP of main signal S1 by an amount that depends on the relative level and phase of that component of auxiliary signal S4.

However, perturbations of the ERP of main signal S1 need not necessarily be problematic. For example, many antennas are designed to provide performance above a specified minimum elevation angle, e.g., 5°. In some embodiments, for example, where main antenna 11 is angled so as to communicate with target antenna 12 that is a satellite antenna, then relatively high amplitude sidelobes 14 of main antenna 11 may be angled such that they do not generate significant components of interfering signal S2 in the direction of victim antenna 15. As such, auxiliary antennas 17, 17' may satisfactorily cancel components of interfering signal S2 that are caused by lower amplitude sidelobes 14, without necessarily causing significant perturbations to main signal S1. Another consideration is the potential perturbation of main signal S1 versus the system specifications of target antenna 12. For example, as noted above, cancellation of relatively high amplitude sidelobes 14 may be anticipated to perturb the ERP of main signal S1. However, such a perturbation may be within the system specifications of target antenna 12.

As mentioned above with respect to FIG. 1, interfering signal S2 generated by sidelobes 14 may include a mixture of orthogonally polarized components, and sensing antenna 16 may be configured to receive a mixture of orthogonal signal components. In such an embodiment, sensing antenna 16 may output a corresponding pair of signals representative of the two orthogonal signal components, and controller 19 may include a corresponding pair of sensing antenna inputs 32. The signals at such inputs may be cross-correlated to obtain the total power density of the incident interfering signal S2. Although the polarization properties of victim antenna 15 may be established, the coupling of cross-polarized components of interfering signal S2 through the axial ratio of the victim antenna may also result in excessive interference power. Thus, the cross-polarized levels may be adaptively controlled, as noted above with respect to FIG. 3.

Alternative Embodiments

While preferred embodiments of the invention are described herein, it will be apparent to one skilled in the art that various changes and modifications may be made. For example, although in many embodiments the inventive systems will include a plurality of auxiliary antennas, e.g., antennas 17, 17' illustrated in FIG. 1, in other embodiments the systems may include only a single auxiliary antenna configured to cancel signal contributions generated by the main antenna. Any suitable number of auxiliary antennas may be provided. Also, for example, the auxiliary antenna(s) need not necessarily be co-located with the main antenna, but may be positioned at any suitable location from which they may transmit an interference-canceling signal to the sensing and victim antennas. The embodiments described apply to communication system applications. However, the methods and apparatus may also be applied to radar system applications. High level radar signals, albeit operating in a different frequency range than nearby systems, may have sufficient levels that nearby receivers may have nonlinear operation that degrades their performance. The adaptive suppression techniques described herein may similarly be applied to radar systems to avoid degradation to other nearby receiving systems, as may be appreciated by those practiced in the art.

The appended claims are intended to cover all such changes and modifications that fall within the true spirit and scope of the invention.

What is claimed:

1. A system for reducing interference received at a victim receiving antenna caused by a main antenna's transmission of a main signal to a target, the interference comprising a sidelobe signal of the main signal, the victim receiving antenna being in a fixed location, the system comprising:
an auxiliary antenna co-located with the main antenna, the auxiliary antenna configured to transmit an auxiliary signal toward the victim receiving antenna, the auxiliary signal being coherently related to the main signal;
a sensing antenna located on a line-of-sight path between the main antenna and the victim receiving antenna and being remote from the main antenna, the sensing antenna configured to receive the sidelobe signal and the auxiliary signal, and to output a first signal based on the received sidelobe and auxiliary signals;
a controller comprising a first input coupled to the sensing antenna and configured to receive the first signal, a second input coupled to the main antenna and configured to receive a second signal comprising an electronic representation of the main signal, and an output coupled to the auxiliary antenna,
the controller being configured to cross-correlate the first signal with the second signal and to adjust at least one of an amplitude, a phase, a polarization, and a frequency characteristic of the auxiliary signal via the output based on the cross-correlation so as to at least partially cancel the sidelobe signal received by the sensing antenna.

2. The system of claim 1, wherein the second signal comprises orthogonally polarized components, and wherein the controller comprises a correlator configured to output a pair of cross-correlation signals based on the cross-correlation, the pair of cross-correlation signals representing correlation between orthogonally polarized components of the first signal and the second signal.

3. The system of claim 1, wherein the controller comprises a processor configured to receive the cross-correlation signal and compute an error value based on the cross-correlation, the error value representing the extent to which the auxiliary signal cancels the sidelobe of the main signal as received by the sensing antenna.

4. The system of claim 3, wherein the processor is further configured to obtain a weighting coefficient that reduces the computed error value.

5. The system of claim 4, wherein the processor provides the weighting coefficient to the auxiliary antenna via the output, the provided weighting coefficient adjusting an amplitude, phase, and polarization of the auxiliary signal.

6. The system of claim 3, wherein the controller further comprises a storage medium configured to store the cross-correlation signal and the error value.

7. The system of claim 1, comprising a plurality of auxiliary antennas.

8. The system of claim 7, wherein at least one auxiliary antenna of the plurality is a different type of antenna than at least one other auxiliary antenna of the plurality.

9. The system of claim 8, wherein at least one auxiliary antenna of the plurality comprises a reflector antenna positioned behind the main antenna, and at least one other auxiliary antenna of the plurality comprises a horn antenna.

10. The system of claim 7, wherein the plurality of auxiliary antennas are mounted to a frame to which the main antenna is mounted.

11. A method for reducing interference received at a victim receiving antenna caused by a main antenna's transmission of a main signal to a target, the interference comprising a sidelobe signal of the main signal, the victim receiving antenna being in a fixed location, the method comprising:

co-locating an auxiliary antenna with the main antenna;

locating a sensing antenna on a line-of-sight path between the main antenna and the victim receiving antenna and being remote from the main antenna;

transmitting an auxiliary signal from the auxiliary antenna toward the victim receiving antenna, the auxiliary signal being coherently related to the main signal;

receiving with the sensing antenna the sidelobe signal and the auxiliary signal;

outputting from the sensing antenna to a controller a first signal based on the received sidelobe and the auxiliary signal;

at the controller, cross-correlating the first signal with an electronic representation of the main signal and, based on the cross-correlation, adjusting at least one of an amplitude, a phase, a polarization, and a frequency characteristic of the auxiliary signal so as to at least partially cancel the sidelobe signal received by the sensing antenna.

12. The method of claim 11, further comprising computing an error value based on the cross-correlation, the error value representing the extent to which the auxiliary signal cancels the sidelobe of the main signal as received by the sensing antenna.

13. The method of claim 12, further comprising storing the cross-correlation and the error value.

14. The method of claim 12, further comprising obtaining a weighting coefficient that reduces the computed error value.

15. The method of claim 14, further comprising providing the weighting coefficient to the auxiliary antenna so as to adjust the amplitude of the auxiliary signal.

16. The method of claim 11, comprising co-locating a plurality of auxiliary antennas.

17. The method of claim 16, wherein at least one auxiliary antenna of the plurality is a different type of antenna than at least one other auxiliary antenna of the plurality.

18. The method of claim 17, wherein at least one auxiliary antenna of the plurality comprises a reflector antenna positioned behind the main antenna, and at least one other auxiliary antenna of the plurality comprises a horn antenna.

19. The method of claim 16, wherein said co-locating comprises mounting the plurality of auxiliary antennas to a frame to which the main antenna is mounted.

* * * * *